United States Patent
Link et al.

(10) Patent No.: US 6,289,514 B1
(45) Date of Patent: Sep. 11, 2001

(54) SYSTEM AND METHOD FOR THE NEAR-REAL TIME CAPTURE AND REPORTING OF LARGE POPULATION CONSUMER BEHAVIORS CONCERNING TELEVISION USE

(75) Inventors: John F. Link, Malvern; George A. Graves, Bala Cynwyd; George Endler, III, Downington; Christopher J. Heimark, Paoli; Thomas A. Brown, West Chester, all of PA (US)

(73) Assignee: QCOM TV, Inc., West Chester, PA (US)

( * ) Notice: Subject to any disclaimer, the term of this patent is extended or adjusted under 35 U.S.C. 154(b) by 0 days.

(21) Appl. No.: 09/280,035

(22) Filed: Mar. 29, 1999

(51) Int. Cl.[7] ....................................................... H04N 7/16
(52) U.S. Cl. ............................................... 725/14; 725/32
(58) Field of Search ................................. 725/9, 14, 20, 725/32, 34, 35, 36

(56) References Cited

U.S. PATENT DOCUMENTS 2,833,859    5/1958    Rahmel et al. .
3,919,479    11/1975   Moon et al. .

(List continued on next page.)

FOREIGN PATENT DOCUMENTS

| 852442     | 7/1998  | (EP) | ................................ H04N/7/16 |
| WO 97/50249 | 12/1997 | (WO) . |
| WO 98/28906 | 7/1998  | (WO) . |
| WO 98/31114 | 7/1998  | (WO) . |

OTHER PUBLICATIONS

Publication by G. Hirtz., et al.: "Open TV: Betriebssystem Fuer Interaktives Fernsehn", Fernseh und Kinotechnik, De, VDE Verlag GmbH, Berlin, vol. 50, NR 3, pp. 84–89 XP000581417, ISSN: 0015–0142, Figs. 4 and 5.

*Primary Examiner*—John W. Miller
(74) *Attorney, Agent, or Firm*—Caesar, Rivise, Bernstein, Cohen & Pokotilow, Ltd.

(57) ABSTRACT

A system and method for identifying television programming, identifying and capturing consumer behavior as regards such programming and providing a nearly-real time reporting of that information to interested parties, while also providing verification of actual delivery of advertising and/or program content.

22 Claims, 10 Drawing Sheets

U.S. PATENT DOCUMENTS

| | | |
|---|---|---|
| 3,973,206 | 8/1976 | Haselwood et al. . |
| 4,025,851 | 5/1977 | Haselwood et al. . |
| 4,048,562 | 9/1977 | Haselwood et al. . |
| 4,230,990 | 10/1980 | Lert, Jr. et al. . |
| 4,245,245 | 1/1981 | Matsumoto et al. . |
| 4,367,488 | 1/1983 | Leventer et al. . |
| 4,425,578 | 1/1984 | Haselwood et al. . |
| 4,450,531 | 5/1984 | Kenyon et al. . |
| 4,511,917 | 4/1985 | Köhler et al. . |
| 4,547,804 | 10/1985 | Greenberg . |
| 4,574,304 | 3/1986 | Watanabe et al. . |
| 4,605,958 | 8/1986 | Machnik et al. . |
| 4,639,779 | 1/1987 | Greenberg . |
| 4,647,974 | 3/1987 | Butler et al. . |
| 4,677,466 | 6/1987 | Lert, Jr. et al. . |
| 4,697,209 | 9/1987 | Kiewit et al. . |
| 4,723,302 | 2/1988 | Fulmer et al. . |
| 4,739,398 | 4/1988 | Thomas et al. . |
| 4,764,808 | 8/1988 | Solar . |
| 4,805,020 | 2/1989 | Greenberg . |
| 4,876,736 | 10/1989 | Kiewit . |
| 4,931,871 | 6/1990 | Kramer . |
| 4,943,963 | 7/1990 | Waechter et al. . |
| 4,945,412 | 7/1990 | Kramer . |
| 4,967,273 | 10/1990 | Greenberg . |
| 4,972,503 | 11/1990 | Zurlinden . |
| 4,994,916 | 2/1991 | Pshtissky et al. . |
| 5,200,822 | 4/1993 | Bronfin et al. . |
| 5,243,423 | 9/1993 | DeJean et al. . |
| 5,280,479 | 1/1994 | Mary . |
| 5,319,453 | 6/1994 | Copriviza et al. . |
| 5,325,127 | 6/1994 | Dinsel . |
| 5,327,237 | 7/1994 | Gerdes et al. . |
| 5,386,240 | 1/1995 | Hori . |
| 5,387,941 | 2/1995 | Montgomery et al. . |
| 5,425,100 | 6/1995 | Thomas et al. . |
| 5,450,122 | 9/1995 | Keene . |
| 5,636,346 | 6/1997 | Saxe . |
| 5,737,026 | 4/1998 | Lu et al. . |
| 5,752,159 | 5/1998 | Faust et al. . |
| 5,778,182 | 7/1998 | Cathey et al. . |
| 5,805,155 | 9/1998 | Allibhoy et al. . |
| 5,815,195 | 9/1998 | Tam . |
| 5,819,156 | 10/1998 | Belmont . |
| 5,826,165 | 10/1998 | Echeita et al. . |
| 5,872,588 | 2/1999 | Aras et al. . |

| FIG. 1A | FIG. 1B |

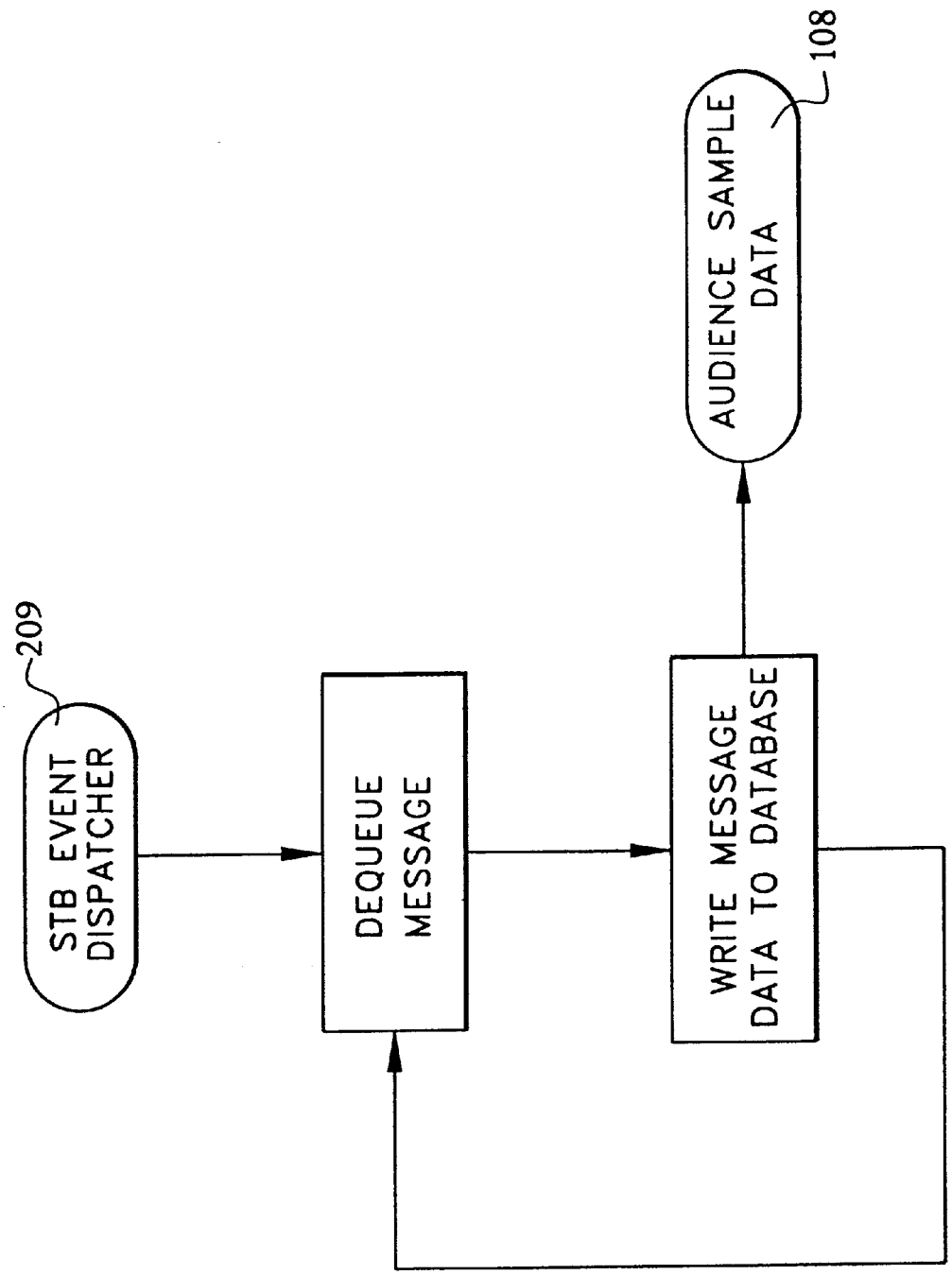

US 6,289,514 B1

SYSTEM AND METHOD FOR THE NEAR-REAL TIME CAPTURE AND REPORTING OF LARGE POPULATION CONSUMER BEHAVIORS CONCERNING TELEVISION USE

FIELD OF THE INVENTION

The invention pertains to the field of automatic monitoring of cable television use, and more particularly, to a system and method for near-real time capturing and reporting of cable television use by consumers.

BACKGROUND OF INVENTION

The purchase of cable television time for advertisers is extremely expensive. As a result, it is has always been desirous to obtain good reliable statistics about who is watching "what" and when they are watching "it". To obtain such information, it is necessary to construct a system/method that is capable of identifying cable media once transmitted, determining which channel consumers are tuned to and then generating useful data from such information. Examples of past and current systems/methods, or portions thereof, directed towards this objective are listed below.

Media encoding systems and processes are known in the art, as shown in U.S. Pat. No. 4,025,851 (Haselwood et al.); U.S. Pat. No. 4,367,488 (Leventer et al.); U.S. Pat. No. 4,547,804 (Greenberg); U.S. Pat. No. 4,574,304 (Watanabe et al.); U.S. Pat. No. 4,639,779 (Greenberg); U.S. Pat. No. 4,647,974 (Butler et al.); U.S. Pat. No. 4,805,020 (Greenberg); U.S. Pat. No. 4,931,871 (Kramer); U.S. Pat. No. 4,945,412 (Kramer et al.); U.S. Pat. No. 4,967,273 (Greenberg); U.S. Pat. No. 4,994,916 (Pshtissky et al.); U.S. Pat. No. 5,280,479 (Mary); U.S. Pat. No. 5,319,453 (copriviza et al.); U.S. Pat. No. 5,325,127 (Dinsel); U.S. Pat. No. 5,327,237 (Gerdes, et al.); U.S. Pat. No. 5,386,240 (Hori); U.S. Pat. No. 5,387,941 (Montgomery et al.); U.S. Pat. No. 5,425,100 (Thomas et al.); U.S. Pat. No. 5,450,122 (Keene); and U.S. Pat. No. 5,737,026 (Lu et al.).

Systems or methods for determining to which frequency a television is tuned are known in the art, as shown in U.S. Pat. No. 3,973,206 (Haselwood et al.); U.S. Pat. No. 4,048,562 (Haselwood et al.); U.S. Pat. No. 4,425,578 (Haselwood et al.); U.S. Pat. No. 4,605,958 (Machnik et al.); U.S. Pat. No. 4,697,209 (Kiewit et al.); U.S. Pat. No. 4,723,302 (Fulmer et al.); U.S. Pat. No. 4,764,808 (Solar) U.S. Pat. No. 4,876,736 (Kiewit); and U.S. Pat. No. 4,972,503 (Zurlinden).

Systems or methods for identifying and verifying broadcasted programs are known in the art, as shown in U.S. Pat. No. 4,450,531 (Kenyon et al.); U.S. Pat. No. 4,511,917 (Köhler et al.); U.S. Pat. No. 4,547,804 (Greenberg); U.S. Pat. No. 4,574,304 (Watanabe et al.); U.S. Pat. No. 4,639,779 (Greenberg); U.S. Pat. No. 4,647,974 (Butler et al.); U.S. Pat. No. 4,677,466 (Lert, Jr. et al.); U.S. Pat. No. 4,739,398 (Thomas et al.); U.S. Pat. No. 4,805,020 (Greenberg); U.S. Pat. No. 4,931,871 (Kramer); U.S. Pat. No. 4,945,412 (Kramer); U.S. Pat. No. 4,967,273 (Greenberg); and U.S. Pat. No. 5,594,934 (Lu et al.).

Systems or methods for determining television audience behavior are known, as shown in U.S. Pat. No. 2,833,859 (Rahmel et al.); U.S. Pat. No. 3,919,479 (Moon et al.); U.S. Pat. No. 4,025,851 (Haselwood et al.); U.S. Pat. No. 4,230,990 (Lert, Jr. et al.); U.S. Pat. No. 4,245,245 (Matsumoto et al.); U.S. Pat. No. 4,450,531 (Kenyon et al.); U.S. Pat. No. 4,511,917 (Köhler et al.); U.S. Pat. No. 4,677,466 (Lert, Jr. et al.); U.S. Pat. No. 4,931,871 (Kramer); U.S. Pat. No. 4,945,412 (Kramer); U.S. Pat. No. 4,739,398 (Thomas et al.); U.S. Pat. No. 4,647,974 (Butler et al.); U.S. Pat. No. 4,943,963 (Waechter et al.); U.S. Pat. No. 5,200,822 (Bronfin et al.); U.S. Pat. No. 5,243,423 (DeJean et al.); U.S. Pat. No. 5,425,100 (Thomas et al.); U.S. Pat. No. 5,450,122 (Keene); U.S. Pat. No. 5,752,159 (Faust et al.) and U.S. Pat. No. 5,778,182 (Cathey et al.).

However, many of the cable systems/methods only poll a plurality of consumer set top boxes, i.e., these systems/methods ask "what is everyone doing at this moment?" Thus, none of these references teach or suggest a system or method for continuously monitoring every consumer set top box in near-real time using existing cable television infrastructure and providing for the aggregation, collection and dissemination of relevant information for near-real time publication.

OBJECTS OF THE INVENTION

Accordingly, it is the general object of this invention to provide an invention that overcomes the disadvantages of the prior art.

It is an object of the present invention to provide a system and method for monitoring interesting events at a plurality of user television set top boxes.

It is still yet a further object of the present invention to provide a system and method for the near-real time collection of information from a plurality of user television set top boxes.

It is still yet another object of the present invention to provide a system and method for handling and processing, in near-real time, information collected from a plurality of user television set top boxes.

It is yet another object of the present invention to provide a system and method that utilizes ongoing transmission from remote locations (set top boxes) to central facilities (headends).

It is yet even a further object of the present invention to provide a system and method whereby information is transmitted to a central facility through the existing cable television infrastructure from a remote location without requiring a "modem" mechanism.

It is still yet even a further object of the present invention to provide a system and method for near-real time capture and reporting of consumer behavior as regards television use.

It is still even yet a further object of the present invention to provide a system and method for near-real time capture and reporting of consumer behavior as regards other peripheral devices (e.g., video cassette recorder, video game, printer, and other auxiliary inputs) coupled to the set top box.

SUMMARY OF THE INVENTION

These and other objects of the instant invention are achieved by providing a set top box for use in a cable television system wherein the set top box is in communication with a television and wherein the set top box transmits information about events (e.g., television on/off, mute on/off, set top box on/off, etc.) of the television to the cable television system whenever television events occur.

These and other objects of the instant invention are also achieved by providing a system for near-real time capturing and reporting of viewer's cable television use for televisions coupled to a cable television network including at least one head end. The system comprises: (1) a first subsystem for generating encoded media assets for transmission through the cable network and whereby the preparation subsystem includes means for assigning a range of codes to be associated with the media assets and with entities that own the media assets to form assigned asset data; (2) a second subsystem, coupled to the first subsystem, comprising at least one set top box coupled to an associated television for receiving the encoded media assets and for obtaining data of television events as they occur, and whereby the at least one set top box generates a message corresponding to each one of the data of television events as they occur; at least one set top box event dispatching means for receiving each of the messages and for routing the messages to collection means within the second subsystem; the second subsystem also includes means for generating statistics from the television event data coupled to the at least one set top box event dispatching means; means for extracting the code from the encoded media assets and creating asset tag timestamps therefrom; and (3) a third subsystem, coupled to the first subsystem and to the second subsystem whereby the third subsystem comprises means for merging the asset tag timestamps with (a) the statistics generated in the second subsystem; (b) information related to published broadcast schedules and to head-end channel line-ups; and (c) the assigned asset data to generate, in near-real time, viewership consolidated data.

These and other objects of the instant invention are also achieved by providing a method for tracking television events of at least one television in a cable system. The method comprises the steps of: providing a cable set top box that is in communication with the cable system and the at least one television; monitoring television events using the cable set top box; and transmitting from said cable set top box a signal indicative of the television events to the cable system as the events occur.

These and other objects of the instant invention are also achieved by providing a method for near-real time capturing and reporting of viewer's cable television use for televisions coupled to a cable television network including at least one head end. The method comprises the steps of: (a) generating encoded media assets for transmission through the cable network; (b) assigning a range of codes to be associated with the media assets and with entities that own the media assets to form assigned asset data; (c) coupling at least one set top box to an associated television for receiving the encoded media assets and for obtaining data about television events as they occur; (d) generating a message, by the at least one set top box, corresponding to each one of the data of the television events as they occur and transmitting them into the cable television network; (e) routing each of the messages to collection means; (f) generating statistics from the television event data; (g) extracting the code from the encoded media assets and creating asset tag timestamps therefrom; (h) merging asset tag timestamps with: the statistics; information related to published broadcast schedules and to head-end channel line-ups; and the assigned asset data to generate, in near-real time, viewership consolidated data.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 5 is a flowchart for a set top box event audience tracking sampler used in the television programming analysis system;

DETAILED DESCRIPTION OF THE PREFERRED EMBODIMENT

Figures 1, 1A:
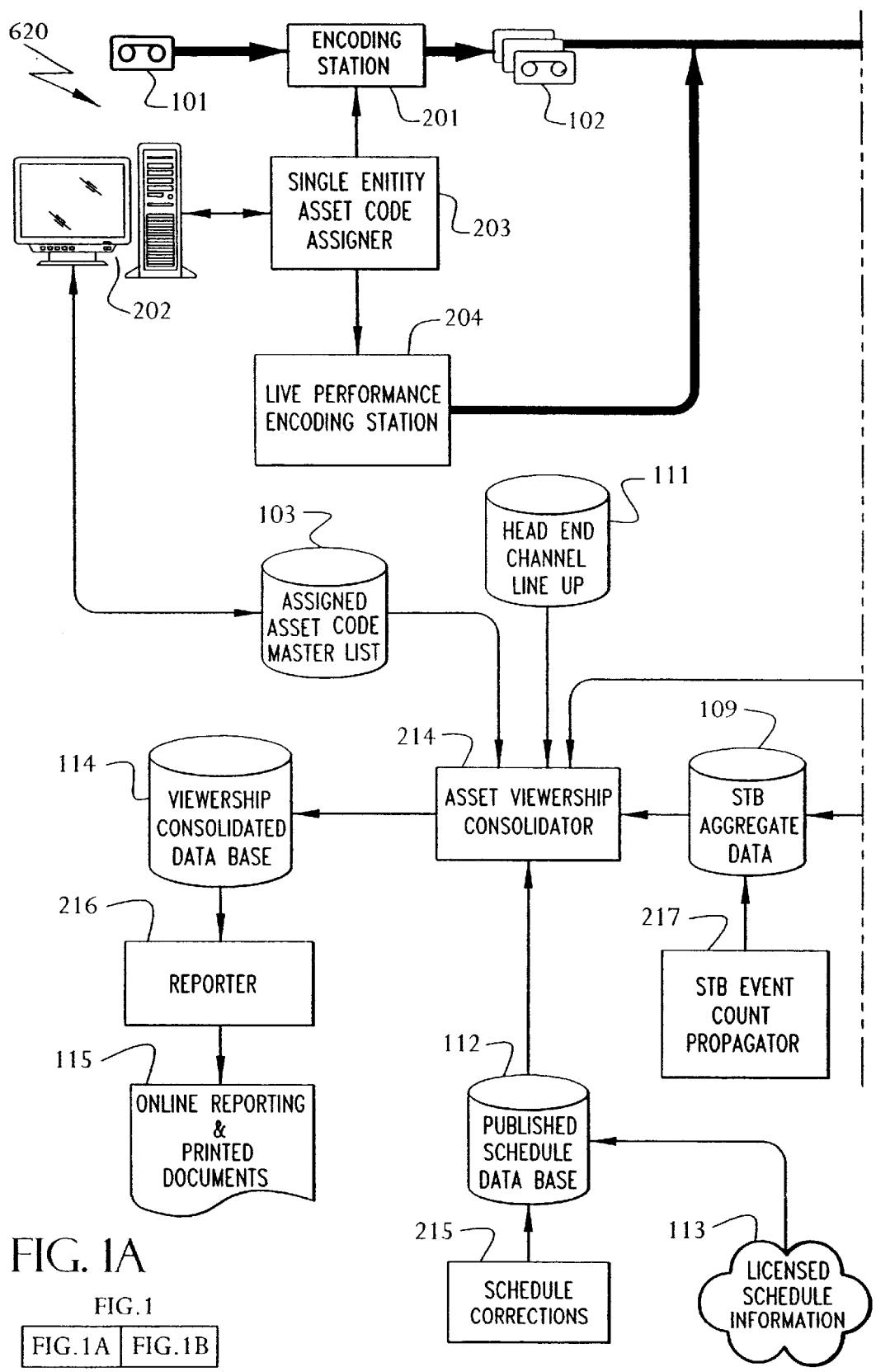
FIG. 1 is a figure layout for FIGS. 1A–1B.
FIGS. 1A and 1B, together, constitute a block diagram of the television programming analysis system.

Referring now in detail to the various figures of the drawing wherein like reference characters refer to like parts, there is shown at 20 in FIGS. 1A–1B, a system for the near-real-time capture and reporting of large population consumer behaviors concerning television use, more concisely known as the television programming analysis system (hereinafter "TPAS"), embodiment of the present invention. This system 20 represents a complete system for identifying television programming, identifying and capturing consumer behavior as regards such programming, and providing a nearly real-time reporting of that information to interested parties. In addition, it can be used to prove actual delivery of advertising and/or program content. A key component of the TPAS 20 is that each consumer set top box (STB) 207, discussed in detail later, permits the near-real time transfer of every interesting event that involves the television operation or the operation of any other peripheral in communication with the STB 207, to a storage system through the existing cable system, as will also be discussed in detail below.

The TPAS 20 comprises three major subsystems, each of which is comprised of several components. There is a preparation subsystem, a delivery/capture subsystem and a consolidation/reporting subsystem. The individual components within these subsystems are shown in FIGS. 1A and 1B. These components are either considered "data" (indicated by three-digit reference numbers beginning with a "1"), a "process" (indicated by three-digit reference numbers beginning with a "2"), or "other item" (indicated by three-digit reference numbers beginning with a "3").

Preparation Subsystem

In order to track consumer behavior regarding television use, the content distributed to consumers (media asset 101, e.g., a video tape) must first be identified in such a way that viewer behavior can be correlated to a specific piece of content. Thus, the preparation subsystem prepares this content for such tracking. In particular, asset codes are assigned to requesting companies and organizations in ranges by a single entity asset code assigner 203. This assignment is then recorded in an assigned asset code master list 103. The companies can then embed their codes into individual assets using the codes from within their assigned range.

Figure 2:
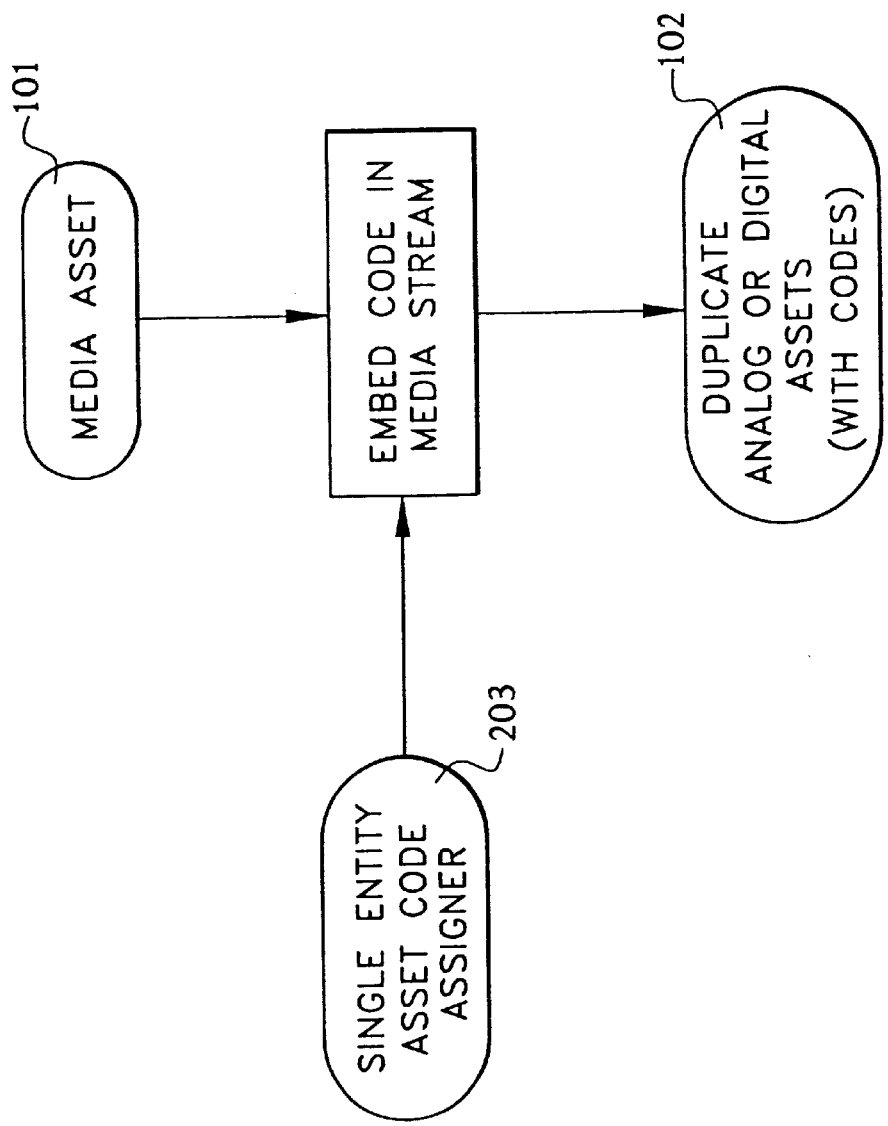
FIG. 2 is a flowchart for a conventional encoding station process used in the television programming analysis system.

The encoding process, i.e., encoding station 201 and live performance encoding station 204, are commercially available today. In particular, the encoding station 201 is, in effect, a duplication station which places the asset code at an appropriate detectable place in the asset in such a way that further duplications of the asset possess the asset code. There will be a number of these encoding stations 201, specifically at least one for each medium to be encoded. The output of the encoding station 201 is one or more duplicate analog or digital assets 102 which contain the embedded asset code. FIG. 2 depicts a flow diagram for the embedding process of the asset code into the frame in the audio/video signal. This technology is currently available from companies such as NorPak Corporation of Ontario, Canada. The live performance encoding station 204 provides a mechanism for embedding asset codes into a live video or audio stream 101 in such a way that they create no perceptible disruption to the signal from the consumer perspective. Devices for this purpose are also commercially available from companies such as NorPak Corporation.

The asset code server 202 is a computer system (e.g., a general purpose computer hardware including computer software designed or tailored for this specific function). The server 202 assigns a range of codes to an entity, such as a company or organization. The range assigned is recorded with entity data such as name, address, contact information, and industry or type of business in the assigned asset master list 103. It should be understood that particular codes within each range are known only to the entity.

The single entity asset code assigner 203 is the process which a company or organization uses to record the association of a specific asset code from their assigned range (per 202) with a media asset. This process may be as sophisticated as a software application running on a general purpose computer hardware, or as simple as recording the association by hand in a notebook.

It should be understood that although the exemplary media asset 101 in this application is a tape, any item which may be broadcast or transmitted can serve as media asset 101. This media asset 101 is then sent to the encoding station 201 to have the asset code inserted into the medium.

Figure 1B:
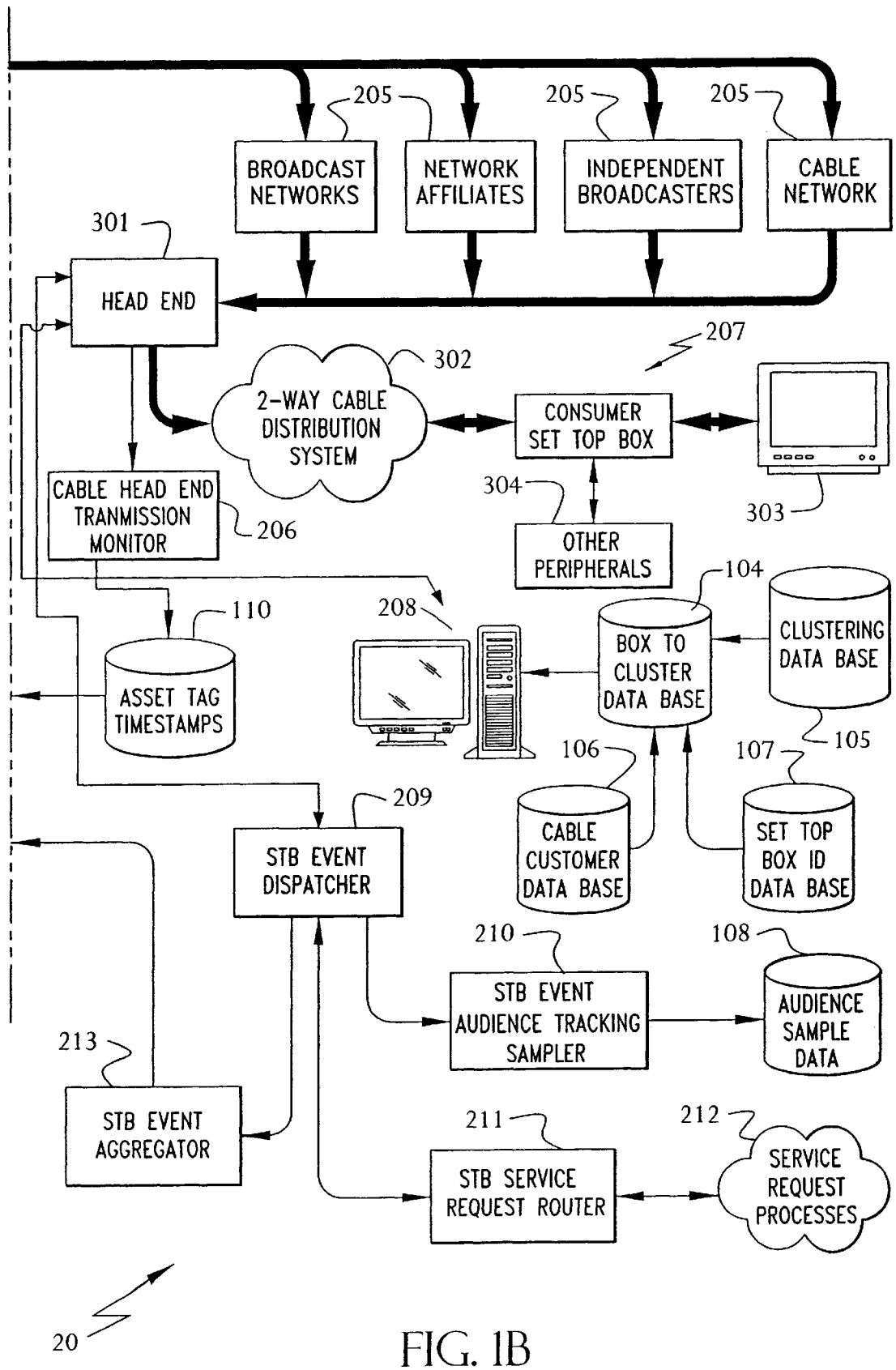

The assets 101 containing the asset code may be duplicated and/or distributed to broadcast networks, network affiliates, independent broadcasters, cable networks and/or cable systems, all of which are designated 205 in FIG. 1B, for broadcast delivery to a cable head end 301. The cable head end 301 is a facility containing the equipment and staff required to deliver media streams to a localized collection of homes and businesses. This is a common facility in the cable television industry.

Once the encoding is complete, those assets are placed into normal distribution channels 205 for delivery to consumer televisions. Delivery/Capture Subsystem With the assets 101 containing the proper asset codes, such programming is broadcast from the cable system head end 301 and sent via a two-way cable distribution system 302 to a consumer set top box (STB) 207 and ultimately to the consumer's television 303. The two-way cable distribution system 302 is the physical network through which a cable television distributor delivers signals to, and captures signals from, individual customers. Other information, such as current time, is sent to the STB 207 from the cable head end 301 as well The STB 207 contains an application that "observes" events with the STB 207 and reports those events deemed "interesting" These events can be reported for any device attached to, or otherwise in communication with, the STB 207. The term "event" includes interactions involving some action of the television 303 or other peripheral devices 304, which the STB 207 is capable of detecting when it occurs. Examples of such devices 304 are: handheld remote controls, keyboards, VCRs, printers, and telephony equipment. The STB 207 reports any interesting action which is considered "significant" (e.g., any change of channel which is not followed by another channel change within ten seconds, failure to communicate with a printer, television on/off, VCR on/off, access data (e.g., WWW, e-mail, etc.)) back through the two-way cable distribution system 302 through the cable head end 301 to an STB event dispatcher 209 which routes information to the appropriate collection mechanism such as an STB event audience tracking sampler 210, an STB service request router 211, or an STB event aggregator 213, all of which are discussed below.

Simultaneously, broadcast transmissions are monitored at the cable head end 301 to determine the precise time of broadcast for certain asset tags previously embedded.

Figure 3:
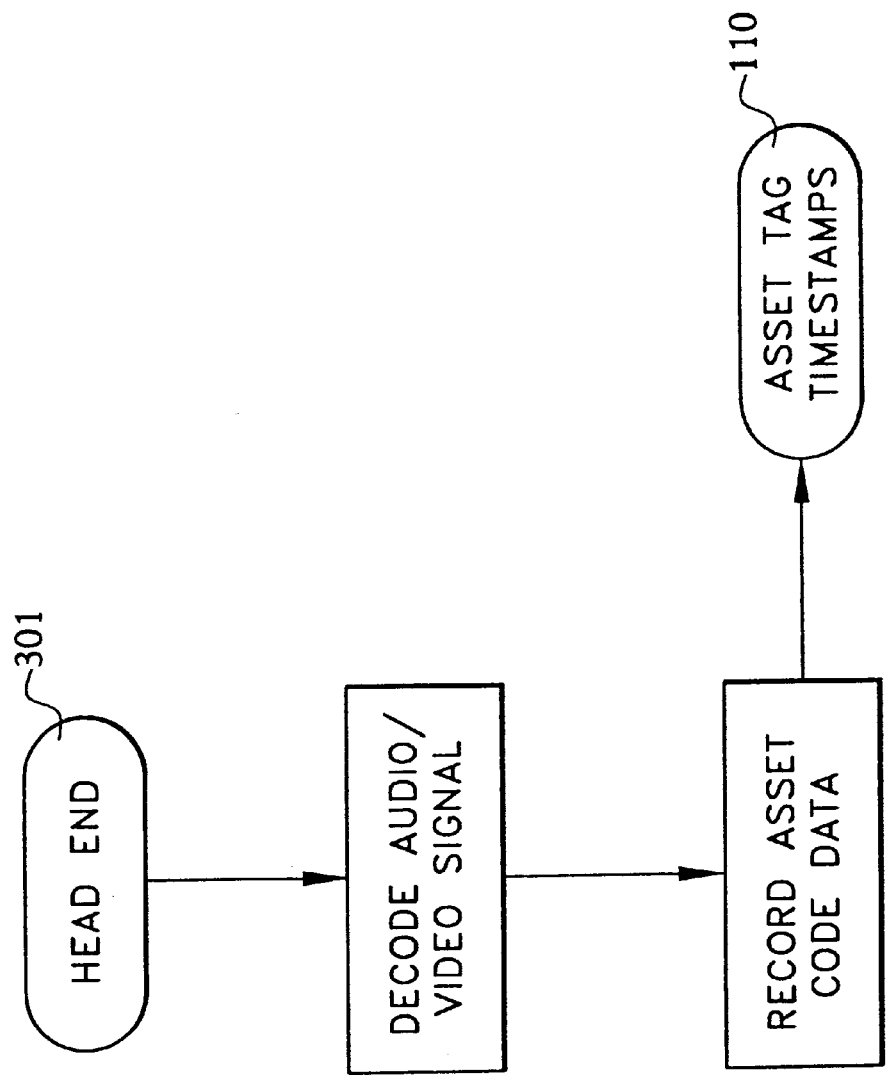
FIG. 3 is a flowchart for a cable head end transmission monitor used in the television programming analysis system.

A cable head end transmission monitor 206 records the occurrence and time of any asset codes which are broadcast to consumers. An analogy of the cable head end transmission monitor 206 might be considered a room full of people, each watching a single television channel and logging in a notebook the title and time of each commercial as it is broadcast. In implementation, there may be several of these automated cable head end transmission monitors 206 per head end. The cable head end transmission monitor 206 is a system consisting of a general purpose computer hardware along with computer software designed or tailored for this specific function. FIG. 3 provides a flow chart for the operation of the cable head end transmission monitor 206. This process extracts the asset code from the frame in the audio/video signal and passes it to a record asset code data process. This process accepts the asset code data from the decode audio/video signal process and inserts a record in an asset tag timestamps file 110. This technology is also commercially available today from companies such as NorPak Corporation.

A consumer set top box (STB) is a device which allows the consumer to tune his/her television while being connected to a cable TV network. These devices are commercially available from companies such as General Instrument Corporation of Horsham, Pennsylvania and Scientific-Atlanta, Inc., of Norcross, Georgia. As used in this patent application, the STB 207 is similar to these conventional STBs except that the internal software has been modified to observe interesting events, as will be discussed in detail below. Furthermore, the STB 207 includes provisions for permitting other peripheral devices 304 to be in communication therewith.

In particular, a STB comprises three components necessary for delivering its basic function. Those three components include the hardware, the operating system, and the 'resident' application.

The hardware is generally a special purpose computer designed to support communications across the cable network and to provide an environment for varying degrees of limited internal processing. Usually, individual hardware components can be interrogated as to their state, and the contents of their registers or storage buffers. This is often accomplished via software programs written in languages which support this level of access. The hardware provides Application Program Interfaces (APIs) which allow an application to query and direct the hardware to perform specific functions.

The operating system (such as Windows® CE by Microsoft of Redmond, Wash., or PowerTV of PowerTV, Inc. of Cupertino, Calif.) manages processes which run on that hardware, including resource scheduling and providing simplified interfaces for tasking/querying hardware components. The operating system may also support APIs and facilities for third parties (i.e., other than the STB manufacturers or operating system manufacturers) to run other software programs on the STBs. Each operating system supplies its own individual set of APIs which define those events that are visible from within that operating system. Examples of events which an operating system might make visible include channel change events, STB on/off events, mute events, etc.

The resident application runs in the environment created by the hardware and the operating system. It is the software program which provides the 'function' which the consumer uses such as channel changes, mute, program guide, etc, i.e., the resident application manages the control interaction. A given resident application may or may not provide APIs to third party programs which would allow visibility to events taking place within the resident program. Resident applications which do provide APIs to third party programs, allowing visibility to events taking place in the operating system, differ from implementation to implementation. As each resident application supplies its own individual set of APIs, those events which are visible from within each resident application varies based on the resident application design. Examples of events which a resident application might make visible include: channel change events, STB on/off events, mute events, etc.

Due to the availability and extent of APIs, third-party applications requiring access to event data have to query the resident application APIs, operating system APIs, hardware components, or some combination of all three in order to completely fulfill its data requirements. Depending on the design of the operating system/resident application, the manner in which the third-party application utilizes the API is different.

With regard to the present invention, the STB 207 is an event-driven STB whereby the third-party application makes an API call for a specific event or class of events and waits. The APIs pass the event data to the third-party application when and if that event occurs. In particular, the third-party application (which is loadable across the cable system network) is stored in the STB memory. The third-party application defines which events it is interested in via software coding/API calls in the software language supported by the particular STB.

This is in contradistinction to 'procedural' environments, whereby the third-party application executes a 'loop' of instructions repeatedly requesting data concerning an event or class of events; the API, in this 'procedural' environment, then returns either the event data (if that event has just happened) or it returns a 'nothing to report' response if no event has occurred.

Once the third-party application has received a response from the hardware APIs, the operating system APIs or the resident program APIs, or a combination thereof, concerning an event of interest, it creates a message which includes data elements that identify the event, the time, the particular STB (i.e., based on an STB identification number), etc., and transmits the message to the STB event dispatcher 209 via the cable network.

An example of the message structure is:
STB ID
Time of message
Current channel
Event
Time Event Occurred
Time Event Last Occurred
Current Sound Volume
Cluster Code
Other related data.

Here are some examples of the types of events the third party application could transmit messages for:
STB On/Off
TV On/Off
VCR On/Off
Channel Change
Mute On/Off
Program Guide On/Off
Audio Source Change (SAP, etc.)
AUX Input Source Change (Video Games, etc.)
Peripheral Device (printer, etc.) On/Off
Non Headend Requests across the cable network (e-mail via a user interface permitting the user to enter text, etc.).
Special Purpose STB Remote Control Button (e.g., "buy", "select", "complete", etc.) request It is important to establish a database regarding STBs and cluster codes. Cluster codes are mathematical groupings of the viewing population such that there is a demographic segmentation of the viewing population based on socioeconomic factors. To that end, the TPAS 20 includes a box-to-cluster-code data base 104 which is produced by merging the possible clustering codes 105 with customers' actual addresses from a cable customer data base 106 and cross-referencing that to a set top box ID data base 107. This action is performed by an STB clustering server 208. The STB clustering server 208 is a system consisting of general purpose computer hardware along with computer software designed or tailored for this specific function. Additionally, the cluster server 208 provides and updates a cluster code for each STB 207. The STB 207 maintains this cluster code in its memory. Depending on the capabilities of the STB 207, this setting or refreshing of the cluster code could be in response to a request made by the STB 207 to the clustering server 208, or it could be initiated by the clustering server 208 by sending an unsolicited message to the STB 207.

The STB event dispatcher 209 (FIGS. 4A–4B) is a system consisting of a general purpose computer hardware along with computer software designed or tailored for this specific function. Its function is to successfully receive messages from the STB 207 from the two-way cable distribution system 302, via the cable head end 301, and to pass those messages along to the appropriate process: an STB event audience tracking sampler 210, an STB service request router 211 or an STB event aggregator 213. In implementation, there may be several of these STB event dispatchers 209 per head end 301.

The STB event audience tracking sampler 210 is used to track the sequence of events (of the televison or other peripheral devices) of particularly-selected STBs. The STB event aggregator 213 is used to track how many STBs experienced particular event(s) (of the television or other peripheral devices).

The following discussion concerns each message received by the STB event dispatcher 209 from the two-way cable distribution system 302, via the cable head end 301.

Figure 4B:
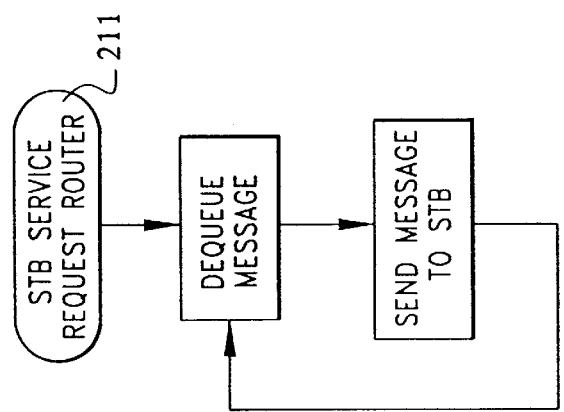
FIGS. 4A and 4B, together, constitute a flowchart for a set top box event dispatcher used in the television programming analysis system.
Figure 4A:
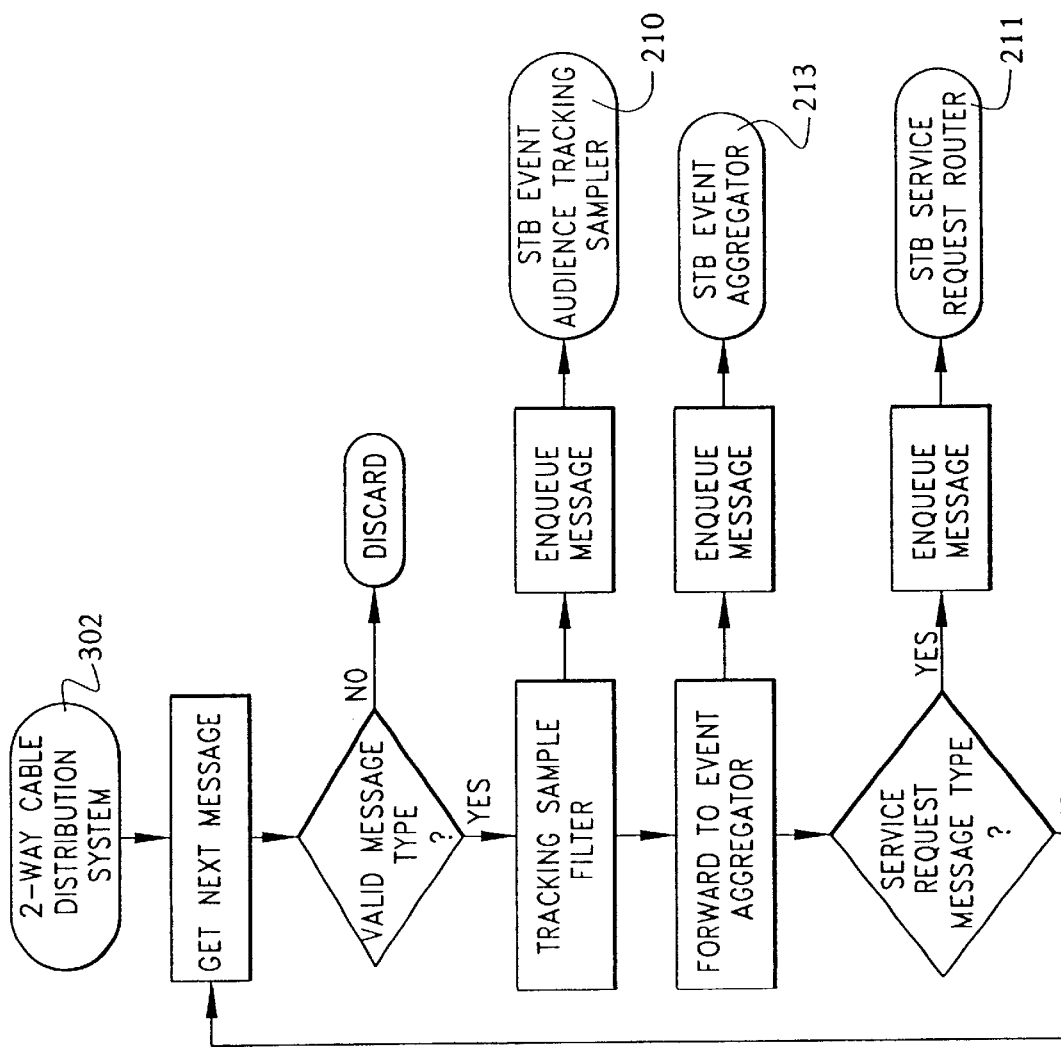

As shown in FIG. 4A, the "Get Next Message" process waits for a message from the two-way cable distribution system 302 to arrive. When a message is received, the message type is interrogated. If the message type is unrecognized, the message is discarded. If the message type is recognized, it passes to the tracking sample filter process. This process determines if this message qualifies for the sample selection criteria (i.e., the process determines if this message originated from an STB 207 whose identification number is listed as participating in the sampling). If so, the message is enqueued for the STB event audience tracking sample process 210. Regardless of whether the message qualifies for the tracking sample filter, it is enqueued to be passed to the STB event aggregrator 213. If the message is a service request message, the message is enqueued for the STB service request router 211.

The following discussion concerns each message received by the STB event dispatcher 209 from the STB service request router 211.

As shown in FIG. 4B, this process waits for a message form the STB service request router 211. When a message is received, it sends it onto the specified STB 207 via the cable head end 301 and through the two-way cable distribution system 302.

The STB event audience tracking sampler 210 (FIG. 5) records the events for a statistically significant sample of the households in the head end 301. The objective of this data is to provide sufficient transaction data to demonstrate that the data collected by the STB event aggregator 213 is valid. The STB event audience tracking sampler 210 is a system consisting of a general purpose computer hardware along with the computer software designed or tailored for this specific function.

As shown in FIG. 5, there process "Write Message to Database" waits for a message from the STB event dispatcher 209. When a message is received, it writes the message to an audience sample data file 108.

The STB service request router 211 directs messages to the correct external service for fulfilling the request. The router 211 then directs the response back to the STB 207.

Figure 6B:
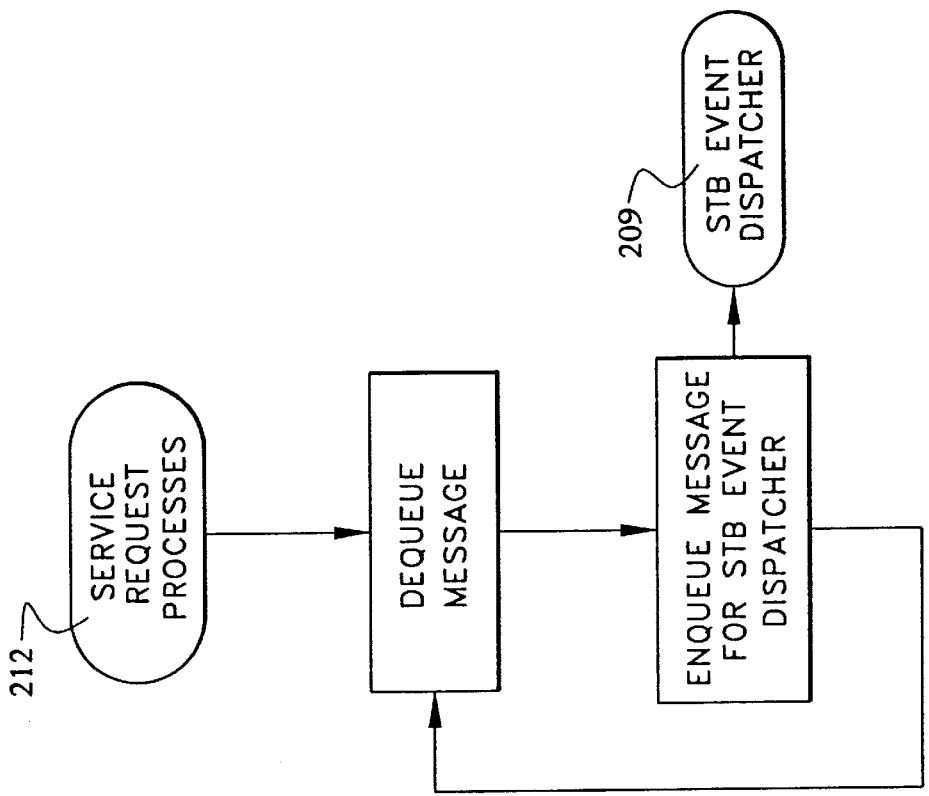
FIGS. 6A and 6B, together, constitute a flowchart for a set top box service request router used in the television programming analysis system.
Figure 6A:
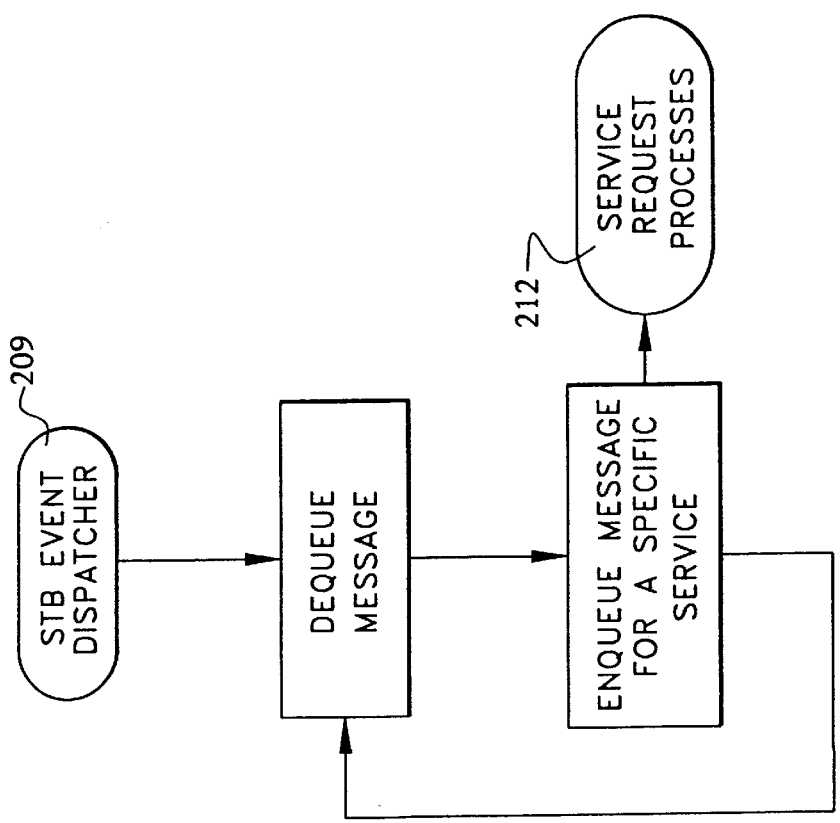

FIGS. 6A and 6B depict the flowchart for the STB service request router 211. In the enqueue for specific service (FIG. 6A), the process reads an STB message from the STB event dispatcher 209 and passes it to the correct external service. In the enqueue for STB event dispatcher (FIG. 6B), the process reads a message from the service request processes 212 and passes it to the correct STB 207. The service request processes 212 are functions external to this application which may be requested via interaction with the STB 207. These functions may include services such as interactive entertainment, commerce (ordering goods and services, financial account management, etc., ), email, and information retrieval.

The STB event aggregator 213 receives STB messages from the STB event dispatcher 209 and aggregates them by time, channel, cluster code and head end. Because the STB event message represents a transition from one state to another, the counts for each channel combination at any point can be considered valid until a transition occurs resulting in a counter being incremented or decremented.

The STB message indicates both the time the last state (channel, etc.) was switched and the time the new states (channel, etc.) was reached. This data allows this device to distinguish between the count of STBs tuned to any particular channel and the count of those STBs transitioning between channels (effectively watching none). This presents a successive approximation phenomena to counts. As messages arrive, the state transition period between the last state time and the current state time is used to decrement the intervening time intervals, giving an increasingly accurate count to those periods.

The STB message provides for events concerning program guide and mute to reach the STB event aggregator 213. This allows for "tri-modal" counting within a channel combination. Tri-Modal counts provide the distinction among those STBs receiving combined audio and video programming, those receiving video programming with audio suppressed, and those receiving audio programming with video, either partially or fully overlaid by program guide, etc.

The thousands of "real-time events" as captured by the STB event dispatcher 209 are combined by the STB event aggregator 209 to relatively few events. Examples of this consolidation might be by second by cluster code. It is important to note that in this combination and reduction of information, the possibility of tracking at the level of individual household may be lost and anonymity may be ensured by the system if desired. The STB event aggregator is a general purpose computer along with computer software designed or tailored for this specific function. Thus, due the high volume of data being transmitted from every STB 207, the STB event aggregator 213 loads up its queue to hold all of the incoming data to avoid bottle-necking the system as it is transferring all of the data to the third subsystem.

Figure 7:
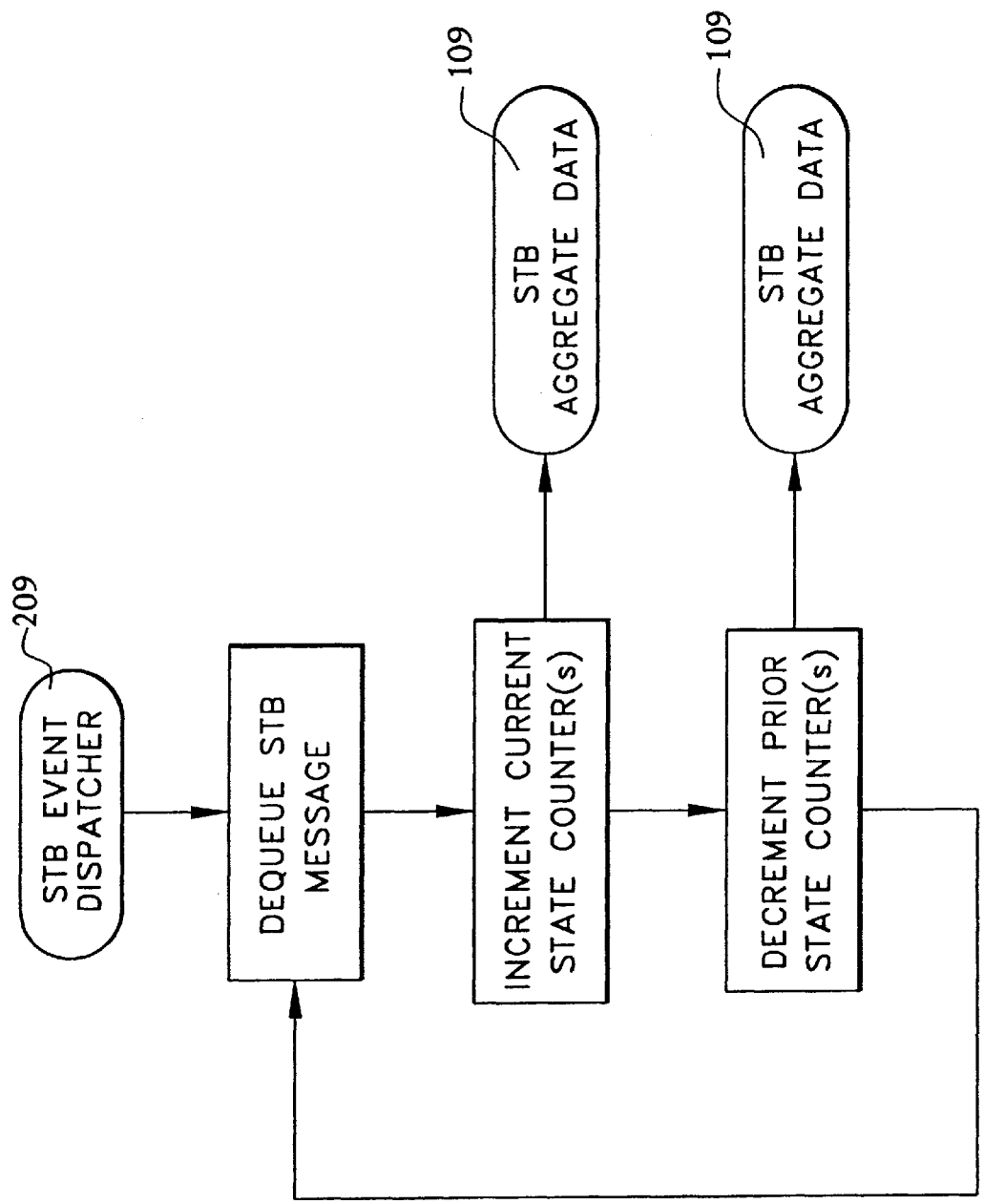
FIG. 7 is a flowchart for a set top box event aggregator used in the television programming analysis system.

As shown in FIG. 7, the dequeue STB message step reads a message from the STB event dispatcher 209. Next, the process uses the time that the current state (channel, mute, program guide, On/Off, etc.) was reached to increment the appropriate counters for that time interval in the STB aggregate data 109. Next, the process uses the time that the current state (channel, mute, program guide, On/Off, etc.) was reached and the time that the prior state was switched to determine the range of time intervals which must be decremented. Once that time range is established, the appropriate counters in the STB aggregate data 109 for each time interval in the range are reduced by one to reflect the transition period between the prior state and the current state.

An STB event count propagation process 217 sets the counter values for the next time interval by propagating counter values for the current time interval forward.

Consolidation/Reporting Subsystem

In this third subsystem, the collected set-top box statistics and asset tags are merged with additional information related to published broadcast schedules and channel lineups and posted via an asset viewership consolidator 214 to a viewership consolidated data base 114. Reporting via all means (e.g., print, electronic, etc.) is produced from the viewership consolidated database 114 and distributed.

In particular, the asset viewership consolidator 214 combines the asset tag timestamp records 110 for the head end 301 with the STB aggregate data 109 to determine the consumer behavior with regards to individual assets. That behavior data is combined with the assigned asset code master list 103 to identify the owner of individual assets which have been presented. Head end channel lineups 111 and a corresponding published schedule database 112 are used with the programming schedule that the consumer behavior is associated with. All that information is consolidated into reporting records which are entered into the viewership consolidated database 114. The asset viewership consolidator 214 is a system consisting of general purpose computer hardware along with computer software designed or tailored for this specific function.

Figure 8:
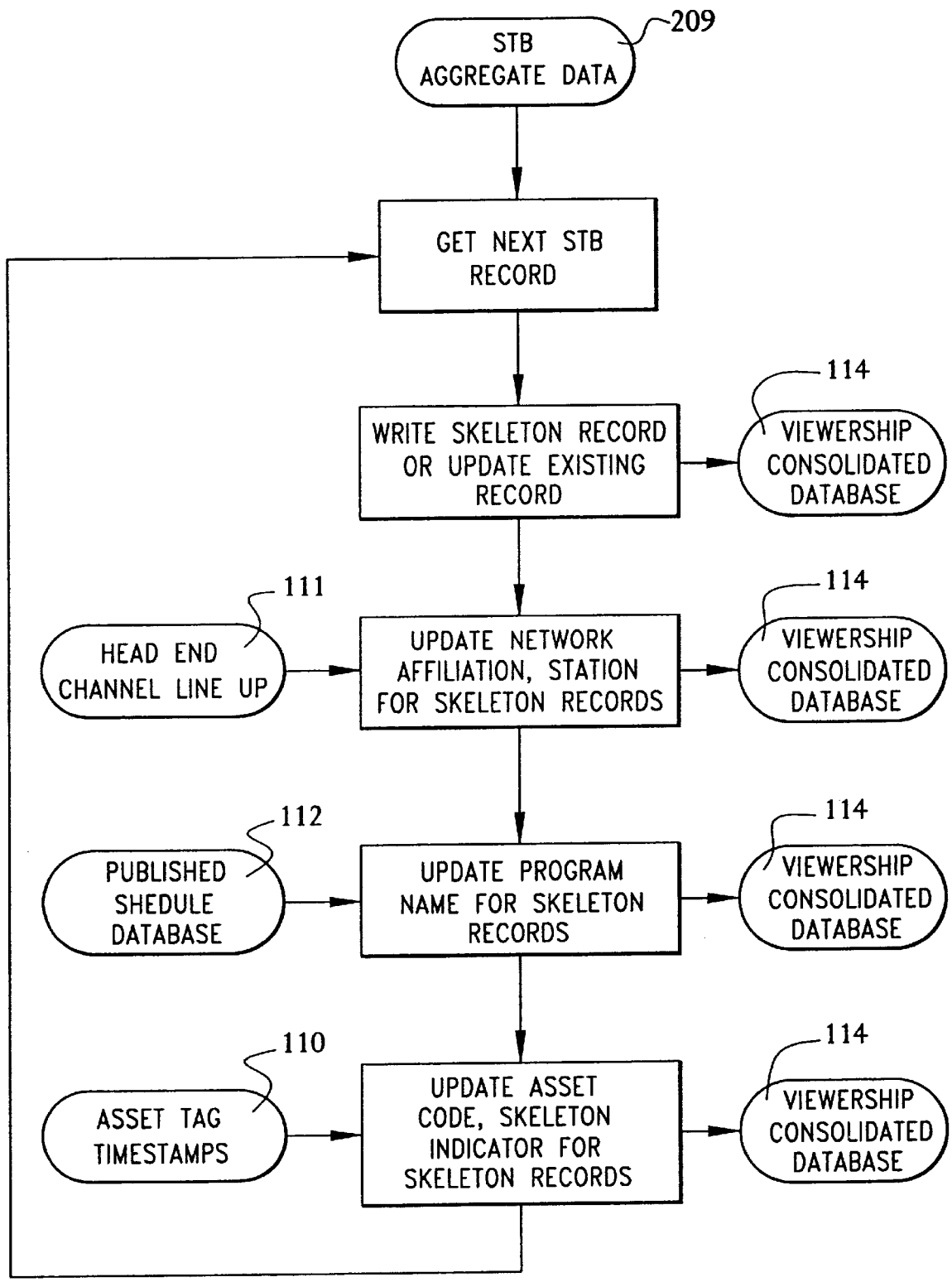
FIG. 8 is a flowchart for an asset viewership consolidator used in the television programming analysis system.

The flowchart for the asset viewership consolidator process 214 is shown in FIG. 8. In particular, in the "Get Next STB record", the process retrieves the next record from the STB aggregate data file 109. Next, the process determines if a record exists for the head end 301/virtual channel number/timestamp in the viewership consolidated database 114. If no record is found, a skeleton record is inserted into the database 114. If a record is found, the counts value is updated for that record. It should be noted that the virtual channel number is the digital channel in the consumer STB 207 although the actual channel being viewed by the consumer is different.

The process (FIG. 8) continues by using the head end 301 ID and the virtual channel number to match a record in a head end channel line up table 111. Using data from that record, the network affiliation and the station fields in the viewership consolidated database 114 is updated.

Next, the process uses the head end ID and the virtual channel number to match a record in the published schedule data base 112. Using data from that record, the program name field in the viewership consolidated database 114 is updated.

The process (FIG. 8) then uses the head end ID and the virtual channel number to match a record in the asset tag timestamp 110. Using data from that record, the asset code field in the viewership consolidated database 114 is updated.

The TPAS 20 also includes a process which provides a mechanism to update the published schedule database 112 to reflect last minute changes. The schedule corrections application 215 is a system consisting of general purpose computer hardware along with computer software designed or tailored for this specific function. The published schedule data base 112 is a combination of licensed schedule information 113 and schedule corrections transactions 215 which are modifications and additions to published schedules. The published schedule database 112 is a commercially available product from companies such as Prevue Networks, Inc. of Tulsa, Okla. and Starsight Telecast, Inc. of Fremont, Calif.

A reporter 216 then scans the viewership consolidated database 114 to produce predetermined or ad-hoc 115 reports for people accessing the system.

Figure 9:
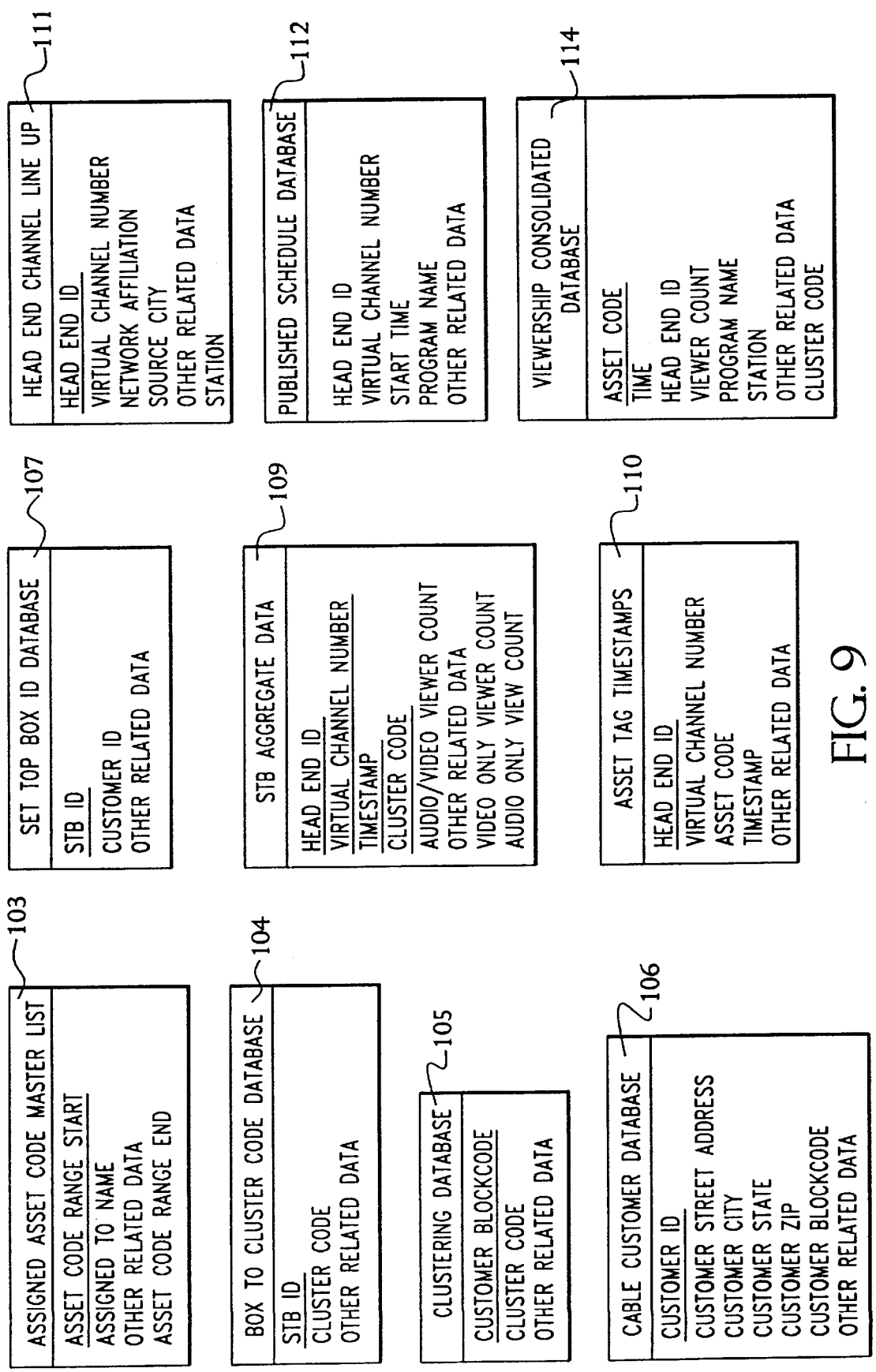
FIG. 9 are database definitions used in the television programming analysis system.

FIG. 9 sets forth the database definitions for the following: assigned asset code master list 103, box to cluster code database 104, clustering database 105, cable customer database 106, STB ID database 107, STB aggregate data 109, asset tag timestamps 110, head end channel line up 111, published schedule database 112 and the viewership consolidated database 114.

Therefore, through the real-time consolidation and availability of information via the TPAS 20, it is envisioned that the latency of available data on millions of observations is measured in seconds, and is thus vastly superior to any collection and reporting system for similar events which has been deployed to date.

The term "near-real time" as used in this patent application means within seconds or units of minutes of a significant event.

Without further elaboration, the foregoing will so fully illustrate our invention that others may, by applying current or future knowledge, readily adopt the same for use under various conditions of service.

We claim:

1. A system for near-real time capturing and reporting of viewers' cable television use for televisions coupled to a cable television network including at least one head end, said system comprising:

a first subsystem for generating encoded media assets for transmission through the cable network, said preparation subsystem including means for assigning a range of codes to be associated with the media assets and with entities that own the media assets to form assigned asset data;

a second subsystem, coupled to said first subsystem, comprising:
at least one set top box coupled to an associated television for receiving said encoded media assets and for obtaining data of television events as they occur, said at least one set top box generating a message corresponding to each one of said data of television events as they occur;
at least one set top box event dispatching means for receiving each of said messages and for routing said messages to collection means within said second subsystem;
means for generating statistics from said television event data coupled to said at least one set top box event dispatching means;
means for extracting the code from the encoded media assets and creating asset tag timestamps therefrom; and a third subsystem, coupled to said first subsystem and to said second subsystem, said third subsystem comprising means for merging said asset tag timestamps with:
said statistics generated in said second subsystem;
information related to published broadcast schedules and to head-end channel line-ups; and
said assigned asset data;
to generate, in near-real time, viewership consolidated data.

2. The system of claim 1 wherein said second subsystem further comprises:
(a) a cluster code database;
(b) a cable customer database;
(c) a set top box identification database; and
(d) cluster code server means for merging data from said cluster code database, said cable customer database and said set top box identification database to generate set top box-to-cluster code data.

3. The system of claim 1 wherein said collection means in said second subsystem comprises a settop box event aggregator for collecting counting data regarding how many set top boxes experienced at least one event for creating set top box aggregate data.

4. The system of claim 3 wherein said collection means in said second subsystem further comprises a set top box audience tracking sampler for recording television event data for a statistically significant sample of households in the at least one head end and for creating audience sample data.

5. The system of claim 4 wherein said collection means further comprises a set top box service request router which routes a service request message from said at least one set top box to an external service.

6. The system of claim 3 wherein said set top box aggregator aggregates received set top box messages by time, channel, cluster code and head end.

7. The system of claim 1 wherein said means for extracting the code in said second subsystem comprises a cable head end transmission monitor that records the occurrence and time of any assigned asset codes which are broadcast over the cable television network and that creates said asset tag timestamps.

8. The system of claim 1 wherein said merging means further comprises means for matching head end identification data and virtual channel number data with published broadcast data for updating said viewership consolidated data.

9. The system of claim 8 wherein said matching means also matches head end identification data and virtual channel number data with said asset tag timestamp data to update said viewership consolidated data.

10. The system of claim 1 wherein said third subsystem further comprises reporter means for providing said viewership consolidated data as on-line information.

11. The system of claim 1 wherein said third subsystem further comprises reporter means for providing said viewership consolidated data as printed documentation.

12. A method for near real time capturing and reporting of viewers' cable television use for televisions coupled to a cable television network including at least one head end, said method comprising the steps of:

(a) generating encoded media assets for transmission through the cable network, (b) assigning a range of codes to be associated with said media assets and with entities that own the media assets to form assigned asset data;

(c) coupling at least one set top box to an associated television for receiving said encoded media assets and for obtaining data about television events as they occur;

(d) generating a message, by said at least one set top box, corresponding to each one of said data of said television events as they occur and transmitting them into the cable television network;

(e) routing each of said messages to collection means;

(f) generating statistics from said television event data;

(g) extracting the code from the encoded media assets and creating asset tag timestamps therefrom;

(h) merging said asset tag timestamps with:
    said statistics;
    information related to published broadcast schedules and to head-end channel line-ups; and
    said assigned asset data;
    to generate, in near-real time, viewership consolidated data.

13. The method of claim 12 wherein said step of generating statistics from said television events data includes utilizing a cluster code database, a cable customer database, a set top box identification database and a cluster code server for merging data from said cluster code database, cable customer database and said set top box identification database to form set top box-to-cluster code data.

14. The method of claim 13 wherein said step of generating statistics from said television events data comprises collecting counting data regarding how many set top boxes experience at least one event and creating set top box aggregate data.

15. The method of claim 14 wherein the step of generating statistics from said television event data includes recording television event data for a statistically significant sample of households in the at least one head end and generating audience sample data.

16. The method of claim 15 further comprising the step of routing a service request message from the at least one set top box to an external service.

17. The method of claim 15 wherein said step of extracting the code from the encoded media assets comprises recording the occurrence and time of any assigned asset codes which are broadcast over the cable television network and creating said asset tag timestamps.

18. The method of claim 14 wherein said step of generating statistics from said television event data further comprises aggregating said counting data by time, channel, cluster code and head end.

19. The method of claim 12 wherein said step of merging said asset tag timestamps further comprises matching head end identification data and virtual channel number data with published broadcast data for updating said viewership consolidated data.

20. The method of claim 19 wherein said step of merging said asset tag timestamps further comprises matching head end identification data and virtual channel number data with said asset tag timestamp data to update said viewership consolidated data.

21. The method of claim 12 further comprising the step of reporting said viewership consolidated data on-line.

22. The method of claim 12 further comprising the step of reporting said viewership consolidated data as printed documentation.

* * * * *